W. H. Lippincott,
Billiard Ball,
N° 77,823.      Patented May 12, 1868.

Witnesses;
Aug. M. Tanner
Chas. A. Pettit

Inventor;
Wm H Lippincott
By Munn & Co.
Attorneys

United States Patent Office.

WILLIAM H. LIPPINCOTT, OF PITTSBURG, PENNSYLVANIA.

*Letters Patent No. 77,823, dated May 12, 1868.*

VULCANITE BILLIARD-BALL.

*The Schedule referred to in these Letters Patent and making part of the same.*

TO ALL WHOM IT MAY CONCERN:

Be it known that I, WILLIAM H. LIPPINCOTT, of Pittsburg, in the county of Allegheny, and State of Pennsylvania, have invented a new and useful Improvement in Process of Manufacturing Billiard-Balls; and I do hereby declare that the following is a full, clear, and exact description thereof, which will enable those skilled in the art to use the same, reference being had to the accompanying drawing, forming part of this specification, in which—

Figure 1:
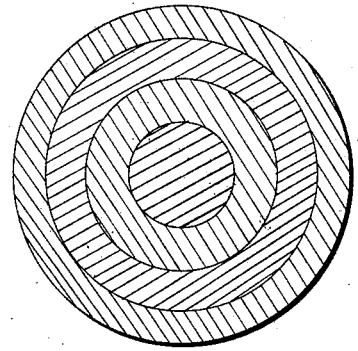
Figure 2:
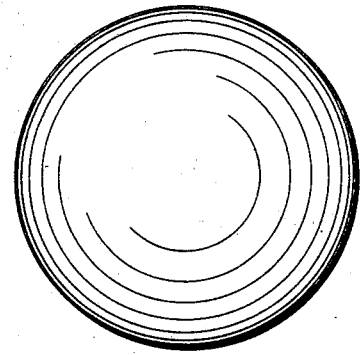

Figure 1 represents a section of a billiard-ball made according to my invention, and Figure 2 is a view of a completed ball.

This invention relates to the manufacture of balls used in playing billiards, bagatelle, and other games where globular balls are employed.

And the invention consists in forming such balls of vulcanized India rubber, in the manner and by the process hereinafter described, whereby I am enabled to furnish a ball for the above purposes, equal or superior in all essential particulars to those made of real ivory, and at greatly reduced cost.

I am aware that many efforts have been made, heretofore, to make these balls from vulcanized rubber, as well as from other materials and compositions, but I am not aware that any article of the kind has been produced, hitherto, which has answered the purpose intended.

By the ordinary or single process, rubber cannot be vulcanized in a mass sufficiently large for the purpose, and secure the requisite qualities, that is, elasticity and uniform density throughout.

By my process a ball is produced possessing the weight, hardness, elasticity, and durability of the best ivory balls.

In carrying out my invention, I employ a variety of moulds, with suitable vulcanizing-apparatus, and I commence by first vulcanizing a central core or nucleus, which core is enclosed in another mould of larger size, containing rubber sufficient to surround the core, which mould, with its contents, is subjected to the same vulcanizing process as the first.

Any number of coatings or layers may be added in this manner, until the ball attains the required size, the vulcanizing operation being performed for each layer, and a mould of increased diameter being employed for each operation.

The ball, when thus formed, is turned and polished in the ordinary manner.

The vulcanizing process is the same, or similar to that pursued by dentists in vulcanizing rubber in their profession, the requisite heat being obtained from steam or water confined in the vulcanizer, and raised to a temperature of about 320°.

It will thus be seen that the ball is formed of different or successive layers of rubber, each layer being vulcanized as it is added to the mass.

The heat to which the ball is subjected at each operation, fuses and combines the joining-surfaces, so that the ball, when completed, is a homogeneous mass from centre to surface, all marks by which the different layers could be distinguished being nearly obliterated.

A ball thus formed possesses all the properties required of billiard-balls, with equal or greater elasticity than ivory, of uniform density, and with all the necessary hardness and tenacity, besides being unaffected by moisture or changes of temperature.

Other substances than rubber may be used as a core, or be surrounded with one or more layers of vulcanite, by the process described, but I consider the pure vulcanite ball the best.

Any desired color may be obtained, from white to black, by bleaching or coloring the rubber before vulcanization, such color being fixed and uniform throughout.

Having thus described my invention, I claim as new, and desire to secure by Letters Patent—

Forming billiard-balls, and other balls of a similar nature, or for similar purposes, of successive layers of rubber, each layer being vulcanized as it is added, substantially as herein described.

The above specification of my invention signed by me, this 11th day of December, 1867.

WM. H. LIPPINCOTT.

Witnesses:
WM. F. MCNAMARA,
ALEX. F. ROBERTS.